No. 617,466. Patented Jan. 10, 1899.
J. R. MACMASTER.
APPARATUS FOR SEPARATING PRECIOUS METALS FROM THEIR ORES.
(Application filed May 16, 1895.)
(No Model.)
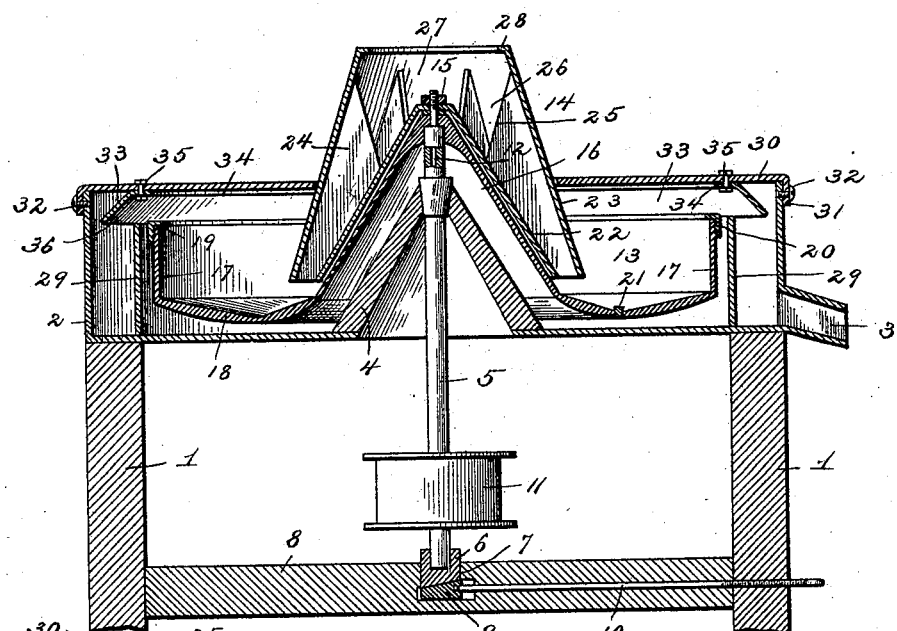
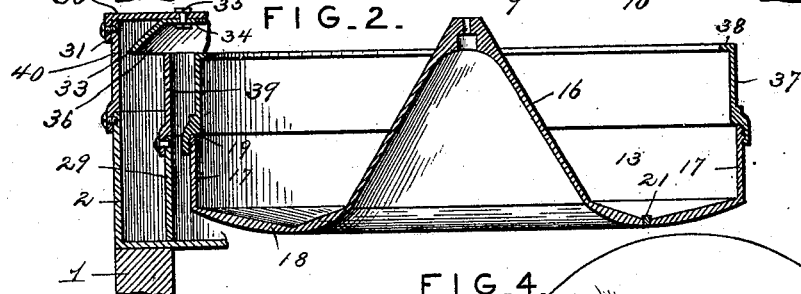
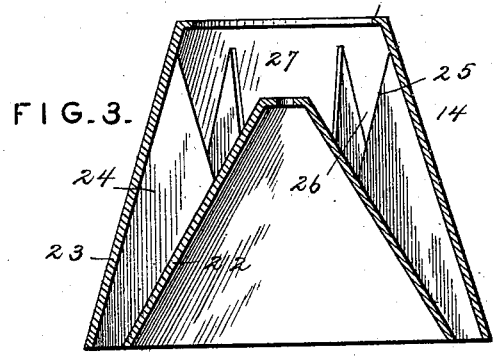
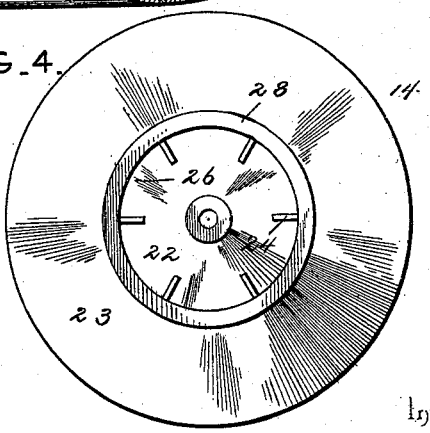
Witnesses
Harry L. Ames.
V. B. Hillyard.
Inventor
James R. Macmaster.
By his Attorneys.
C. A. Snow & Co.
THE NORRIS PETERS CO., PHOTO-LITHO., WASHINGTON, D. C.

UNITED STATES PATENT OFFICE.

JAMES R. MACMASTER, OF POMEROY, WASHINGTON.

APPARATUS FOR SEPARATING PRECIOUS METALS FROM THEIR ORES.

SPECIFICATION forming part of Letters Patent No. 617,466, dated January 10, 1899.

Application filed May 16, 1895. Serial No. 549,465. (No model.)

*To all whom it may concern:*

Be it known that I, JAMES R. MACMASTER, a citizen of the United States, residing at Pomeroy, in the county of Garfield and State of Washington, have invented a new and useful Apparatus for Separating Precious Metals from their Ores, of which the following is a specification.

This invention has relation to that class of ore-separators which depend for their successful operation upon centrifugal force and the affinity which quicksilver has for the precious metals; and the object of the same is to provide a separator which will be compact in form, comprise a minimum number of parts in its organization, and perform the required work in a rapid and satisfactory manner.

The improvement consists, primarily, of a rotating cylinder and a feeder, the latter occupying a central position with respect to the cylinder and having a series of separate and independent passages which terminate a short distance above the bottom of the cylinder and which communicate at their upper ends with a chamber common to all the passages and which receives the ore to be separated.

The invention also consists of the peculiar formation of the central portion of the separating-cylinder and the novel construction of the feeder coöperating therewith, whereby in the operation of the separator the ore as it leaves the lower ends of the passages of the feeder is thrown outward by centrifugal action against the sides of the cylinder and against a film of mercury adhering by centrifugal action against the sides of the said cylinder, whereby the particles of the precious metal penetrate the mercurial film and are taken up thereby, whereas the quartz, sand, and water escape over the edge of the cylinder into a suitable receptacle, from whence they are carried away to a convenient point of discharge.

In carrying out the principles of the invention the improvement may be said to consist of the novel features and the peculiar construction and combination of the parts, which hereinafter will be more fully set forth and claimed, and which are illustrated in the accompanying drawings, in which—

Figure 1 is a central vertical section of an ore-separator constructed in accordance with the principles of the present invention. Fig. 2 is a central vertical sectional view showing the walls of the receptacle and the rotating separating-cylinder composed of detachable sections. Fig. 3 is a vertical central section of the feeder on a larger scale. Fig. 4 is a top plan view of the feeder.

The framework 1 for supporting the operating parts of the separator will be of suitable construction best adapted for supporting the several parts in a substantial manner. A receptacle 2 is mounted upon the framework and is formed with a discharge-spout 3, and this receptacle is centrally apertured and has a cone 4 rising vertically from the middle thereof, the lower edge portion of the cone encircling the centrally-disposed opening. A vertically-disposed shaft 5 is journaled near its upper end in the apex of the cone 4 and at its lower end in a block 6, located in a socket 7 in a horizontal portion 8 of the framework and is adjusted vertically by means of a wedge 9, adapted to be forced beneath the lower beveled side of the bearing-block 6, said wedge being operated by means of a rod 10. The shaft 5 is adapted to be rotated in any convenient manner and is shown supplied with a pulley 11 for the reception of a drive-belt from any suitable source of power. The upper portion of the shaft 5, extending above the cone 4, is formed with a longitudinal bore 12 to serve as a convenient means for supplying a lubricant to the upper bearing, and to this upper portion are secured the separating-cylinder 13 and the feeder 14, both being mounted upon a reduced end of the shaft and confined thereon between the shoulder occurring at the base of the reduced portion and a binding-nut 15, mounted upon the threaded end of the said reduced portion.

The separating-cylinder 13 has a central conical portion 16, an outer vertical wall 17, and a depressed bottom 18, the latter inclining upwardly from about a middle point toward the cone 16 and the outer wall 17. The upper edge of the wall 17 is formed with an inwardly-extending flange 19, which is removably attached thereto, said flange 19 forming the horizontal portion of an inverted-L-shaped ring 20, which is fitted by a screw-thread joint or in any convenient manner to the upper portion of the said wall 17. It is desirable to have the ring 20 detachably connected with the separating-cylinder, because it is soon worn out by the passage thereover of the quartz, sand, and other waste material resultant from the separating process. Hence if the flange 19 were an integral part of the wall 17 or the separating-cylinder considerable expense would be attendant in the replacement of the same when worn. Therefore the advantage of making the part 20 detachable can be readily appreciated. The bottom portion of the separating-cylinder is formed with a discharge-opening, which is closed by a stopper or plug 21, through which the mercury is discharged when it is required to remove the same from the separating-cylinder for any purpose.

The feeder 14 in general appearance represents a truncated cone and comprises an inner conical shell 22 and an outer conical shell 23, and between these two shells are located a series of radially-disposed partitions 24, which have their upper portions cut away on an angle which inclines upwardly and outwardly from the inner shell 22, as shown at 25, and between these partitions are formed a series of passages 26, which communicate at their upper ends with a chamber 27, common to all the passages and into which the ore to be separated is supplied in any convenient manner. The outer shell 23 has an inwardly-extending flange 28 at its upper end, which prevents the splashing outward of the ore when the separator is in operation.

A wall 29 rises vertically from the bottom of the receptacle 2 and extends parallel with the outer vertical wall thereof, and its top edge terminates about in a plane corresponding with the upper edge of the outer wall 17 of the separating-cylinder, and an annular space is formed between the wall 29 and the outer vertical wall of the receptacle 2. The receptacle 2 is closed at its upper end by a cover 30, which is centrally apertured for the passage of the upper portion of the feeder 14, and its outer edge is flanged, as shown at 31, to embrace the upper edge portion of the receptacle 2, and is removably attached thereto by fastenings 32 or in any desired manner. A deflector 33 is secured to the cover 30 and extends into the space provided between the wall 29 and the vertical wall of the receptacle 2, and this deflector serves to direct the sand, quartz, and other waste material into the said space in the effective working of the separator. The deflector 33 is a ring having a horizontal portion 34, which is secured to the cover 30 by bolts 35 or other fastenings, and an outwardly and downwardly inclined portion 36.

In treating some classes of ores and for particular uses it is desirable to extend the vertical wall 17 of the separating-cylinder, and such a construction is shown in Fig. 2, which illustrates the separating-cylinder supplied with an auxiliary section 37, which is attached at its lower edge to the wall 17 and having an inwardly-extending flange 38 at its upper end. The lower portion of the extension 37 projects beyond the inner face of the wall 17, so as to provide the equivalent of the inwardly-extending flange 19. In this construction it will also be necessary to increase the height of the wall 29 and the outer wall of the separating-cylinder. Hence the wall 29 has an extension 39 and the outer wall of the receptacle 2 an extension 40, to which the cover 30, with the attached deflector 33, is secured.

The operation of the invention is as follows: The separating-cylinder and feeder are caused to revolve at a high rate of speed by the application of sufficient power to the shaft 5 in any desired manner, preferably by means of a driving-belt passing around the pulley 11. The ore to be separated is directed into the compartment 27 of the feeder and gravitates through the several passages 26, and when it reaches the lower ends of the passages it is thrown outwardly by centrifugal action against the vertical wall 17 of the separating-cylinder without coming in contact with the bottom thereof. Prior to the starting of the machine or separator the cylinder is supplied with a proper quantity of mercury, which, under the high rotation of the separating-cylinder, spreads itself in a continuous film against the inner side of the wall 17, and this operation is facilitated by coating the inner face of the wall 17 with copper and plating the same with silver in any desired manner, and the affinity of the mercury for silver causes the mercury to spread itself over the inner face of the wall 17, the said mercury by centrifugal action being retained in a sufficient quantity and thickness of film to attain the desired result of separating the gold from the ore. The ore in its outward flight after leaving the lower end of the feeder strikes the film of mercury, and the particles of gold penetrating the said film are absorbed thereby, whereas the sand, quartz, water, and other waste material glide off in an upward direction and pass over the edge of the separating-cylinder and are directed downward by means of the deflector 33 and escape from the receptacle 2 by means of the spout 3. The inwardly-extending flange 19 retains the film of mercury and prevents any possible escape thereof. After the separator has been in operation a sufficient length of time and it is required to ascertain the condition of the mercury the operating parts are brought to a standstill and the excess or surplus of mercury gravitates to the bottom of the separating-cylinder and is drawn off through the opening closed by the plug or stopper 21, and the amalgam adhering to the inner face of the vertical wall 17 is removed by means of a cloth or in any convenient manner and is subsequently treated to remove the precious metal or gold therefrom. The constant pounding against the mercury and the running of the water will preserve the surface of the mercury fresh and bright, thereby facilitating the separating process.

While the construction herein shown is preferred, it is obvious that various changes in the form, proportion, and the minor details of construction may be resorted to without departing from the principle or sacrificing any of the advantages of this invention.

Having thus described the invention, what is claimed as new is—

1. In an ore amalgamator and separator, the combination of a rotating separating-cylinder having a centrally-disposed cone, a depressed bottom, and an outer wall, a ring detachably connected with the upper end of the outer wall and provided with an inner flange to extend over the upper end of the said wall and project into the cylinder a short distance, and a substantially vertically-arranged feeder appearing as a truncated cone mounted to revolve with the cylinder and comprising an inner conical shell and an outer conico-cylindrical shell joined by radial partitions forming passages, the upper ends of the partitions being cut away on upwardly and outwardly divergent lines to form a chamber common to all the passages, and the outer shell projecting above the inner shell and having an inwardly-extending flange at its upper end, substantially as set forth.

2. In an ore amalgamator and separator, the combination of a receptacle comprising inner and outer walls having a space formed between them, a rotating separating-cylinder, a section having detachable connection with the vertical wall of the separating-cylinder and provided at its upper end with an inwardly-extending flange, similar sections detachably connected with the inner and outer walls of the receptacle, a cover secured to the upper edge of the outer section, and an annular deflector secured to the cover and operating in the space formed between the inner and outer sections applied to the walls of the receptacle, substantially as and for the purpose set forth.

In testimony that I claim the foregoing as my own I have hereto affixed my signature in the presence of two witnesses.

JAMES R. MACMASTER.

Witnesses:
  JOHN H. SIGGERS,
  G. C. SHOEMAKER.